(12) United States Patent
Akutsu et al.

(10) Patent No.: US 9,580,207 B2
(45) Date of Patent: Feb. 28, 2017

(54) POUR-OUT MEMBER FOR DISCHARGING VISCOUS FLUID

(71) Applicant: TOYO SEIKAN GROUP HOLDINGS, LTD., Tokyo (JP)

(72) Inventors: Yosuke Akutsu, Kanagawa (JP); Shigetoshi Horiuchi, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 210 days.

(21) Appl. No.: 14/359,182

(22) PCT Filed: Nov. 21, 2012

(86) PCT No.: PCT/JP2012/080236
§ 371 (c)(1),
(2) Date: May 19, 2014

(87) PCT Pub. No.: WO2013/077380
PCT Pub. Date: May 30, 2013

(65) Prior Publication Data
US 2014/0332570 A1    Nov. 13, 2014

(30) Foreign Application Priority Data
Nov. 21, 2011    (JP) .................................. 2011-254415

(51) Int. Cl.
*B65D 23/08* (2006.01)
*B32B 5/16* (2006.01)
(Continued)

(52) U.S. Cl.
CPC ........... *B65D 23/0814* (2013.01); *B05D 1/18* (2013.01); *B05D 5/00* (2013.01); *B32B 3/08* (2013.01);
(Continued)

(58) Field of Classification Search
CPC ... B65D 23/0814; B65D 23/06; Y10T 428/13; B05D 1/18; B05D 5/00;
(Continued)

(56) References Cited

U.S. PATENT DOCUMENTS

| 7,449,283 B2 | 11/2008 | Nishi et al. |
| 2005/0214528 A1 | 9/2005 | Iijima |

(Continued)

FOREIGN PATENT DOCUMENTS

| JP | 02-019261 | 1/1990 |
| JP | 10-24267 | 1/1998 |

(Continued)

OTHER PUBLICATIONS

English machine translation of JP 201179544.*

(Continued)

*Primary Examiner* — Michael C Miggins
(74) *Attorney, Agent, or Firm* — Greenblum & Bernstein, P.L.C.

(57) ABSTRACT

A pour-out member or, for example, a container has a pour-out port 1a through which a viscous fluid is discharged, wherein a hydrophobic layer of fine hydrophobic inorganic particles 20 is selectively formed on an upper end surface of a base member forming the pour-out port 1a. The hydrophobic layer formed on the pour-out port 1a of the pour-out member is not removed or broken through the repetitive use, and stably exhibits a function of preventing the liquid from creeping over extended periods of time.

10 Claims, 5 Drawing Sheets

(51) Int. Cl.

| | | |
|---|---|---|
| B32B 3/08 | (2006.01) | |
| B65D 23/06 | (2006.01) | |
| B05D 1/18 | (2006.01) | |
| B05D 5/00 | (2006.01) | |
| B32B 37/00 | (2006.01) | |
| B32B 37/14 | (2006.01) | |
| B32B 37/24 | (2006.01) | |
| B29C 59/02 | (2006.01) | |

(52) U.S. Cl.
CPC .............. *B32B 5/16* (2013.01); *B32B 37/025* (2013.01); *B32B 37/144* (2013.01); *B32B 37/24* (2013.01); *B65D 23/06* (2013.01); *B29C 2059/028* (2013.01); *B29K 2995/0093* (2013.01); *B32B 2037/243* (2013.01); *B32B 2307/73* (2013.01); *B32B 2311/00* (2013.01); *B32B 2439/60* (2013.01); *Y10T 428/13* (2015.01)

(58) Field of Classification Search
CPC ...... B29C 2059/028; B29K 2995/0093; B32B 5/16; B32B 3/08; B32B 37/025; B32B 37/144; B32B 37/24; B32B 2037/243; B32B 2307/73; B32B 2311/00; B32B 2439/60
See application file for complete search history.

(56) References Cited

U.S. PATENT DOCUMENTS

| | | |
|---|---|---|
| 2008/0008859 A1 | 1/2008 | Catalfamo |
| 2010/0230344 A1 | 9/2010 | Srinivas et al. |
| 2012/0118886 A1 | 5/2012 | Sekiguchi et al. |
| 2014/0041905 A1 | 2/2014 | Srinivas et al. |

FOREIGN PATENT DOCUMENTS

| | | |
|---|---|---|
| JP | 10-138655 | 5/1998 |
| JP | 2000-319109 | 11/2000 |
| JP | 2001-097384 | 4/2001 |
| JP | 2001-260360 | 9/2001 |
| JP | 2004-136653 | 5/2004 |
| JP | 2005-178055 | 7/2005 |
| JP | 2009-066945 | 4/2009 |
| JP | 2009-541102 | 11/2009 |
| JP | 2010-184454 | 8/2010 |
| JP | 2010-529231 | 8/2010 |
| JP | 2010-254377 | 11/2010 |
| JP | 2011-079544 | 4/2011 |
| JP | 2011-105339 | 6/2011 |
| WO | 03/076090 | 9/2003 |

OTHER PUBLICATIONS

English machine translation of JP 2010254377.*
English machine translation of JP 2010529231.*
English machine translation of JP 2005178055.*
Search report from PCT/JP2012/080236, mail date is Jan. 8, 2013.
Extended European Search Report issued Jul. 23, 2015 in EP Application 12851900.6.
Korean Office Action issued in Patent Appl. No. 10-2014-7016900, dated Mar. 15, 2016.
Anonymous, "Surface Roughness (JIS B 0601-2001)", XP055091052, INET [retrieved on Dec. 2, 2013], Jan. 1, 2001.
Search Report issued in European Patent Application No. 12851900.6, dated Apr. 28, 2016.
Korean Office Action issued in Patent Application No. 10-2014-7016900, dated Sep. 23, 2016.
Japanese Office Action issued in Patent Application No. 2013-545954, dated Oct. 4, 2016.

* cited by examiner

— ROUGHNESS CURVE OF EXAMPLE 1

— ROUGHNESS CURVE OF COMPARATIVE EXAMPLE 1

POUR-OUT MEMBER FOR DISCHARGING VISCOUS FLUID

TECHNICAL FIELD

This invention relates to a pour-out member having a pour-out port. More specifically, the invention relates to a pour-out member used for discharging liquids such as beverages and liquid seasonings or for pouring out such liquid contents, the pour-out member being, for example, a container, a cap with pour-out port, a nozzle, a spout or a container preform.

BACKGROUND ART

Pour-out members having pour-out port for discharging viscous liquids, such as containers, spouts fitted to caps with pour-out port, bag-like containers and paper containers, filler nozzles for filling foods, ink-jet nozzles and the like, have been widely used for a variety of kinds of applications such as industrial products, fittings for applying adhesives or solders, fittings used for experiments and equipment for inspection and medicinal uses. The pour-out ports of such pour-out members are made from various materials depending on the use, and many of the materials are plastics, glasses and metals. The containers, too, can be grouped into those of plastics, glasses and metals depending on the materials from which they are made. Here, the containers made from any material are in many cases in the form having a cap that is fitted to the mouth portion by screw-engagement or just being fitted thereto, featuring excellent sealing property, lending themselves well suited for containing a variety of kinds of liquids such as beverages and liquid seasonings.

In recent years, it has been urged to heighten the quality of the base material forming the pour-out port. From the standpoint of sanitation, shutting off the liquid and feeding the liquid at a constant rate, it has also been requested to make a contrivance to lessen the effect of the liquid that remains on the end of the nozzle. However, the containers containing liquids are, without exception, accompanied by a problem of liquid creeping. Therefore, a contrivance becomes necessary so that, when the liquid contained in the container is poured out through the mouth portion, the liquid that is poured out will not drip onto the exterior creeping along the outer wall surface of the mouth portion of the container. The same also holds true even for the pour-out members other in addition to the containers.

A variety of proposals have been made concerning the containers for effectively preventing the liquid from creeping. However, many of them are to forma water-repellent film on the inner and outer surfaces of the mouth portion of the containers. For instance, a patent document 1 proposes forming a film of tin oxide or titanium oxide on the mouth portion of the containers.

As a container forming a water-repellent surface, further, a patent document 2 proposes depositing fine particles of a hydrophobic oxide on the surface that comes in contact with the content in the container.

PRIOR ART DOCUMENTS

Patent Documents

Patent document 1: JP-A-2001-97384
Patent document 2: JP-A-2010-254377

OUTLINE OF THE INVENTION

Problems that the Invention is to Solve

Forming a water-repellent film (hydrophobic layer) on the mouth portion of the containers is effective in preventing the liquid from creeping as is done by the above prior arts. There, however, still remain problems in that the hydrophobic film that is formed on the mouth portion of the container undergoes deformation and breakage due to aging, and the water-repelling property decreases and extinguishes due to stress produced when the cap is closed, that the water-repellent film is removed to lose water-repelling property when the cap is opened and, besides, that the removed film moves and enters into the liquid content.

It is, therefore, an object of the present invention to provide a pour-out member having a pour-out port that maintains close adhesion to the film and that excellently sustains water-repelling property.

Another object of the present invention is to provide a pour-out fitting having, being selectively formed on the pour-out port, a stable hydrophobic layer that is not removed or broken through the repetitive use, the pour-out fitting effectively preventing the liquid from creeping.

A further object of the present invention is to provide a method of producing a pour-out fitting having the above hydrophobic layer formed on the pour-out port.

Means for Solving the Problems

According to the present invention, there is provided a pour-out member having a pour-out port through which a viscous fluid is discharged, wherein a hydrophobic layer of fine hydrophobic inorganic particles is selectively formed on an upper end surface of a base member forming the pour-out port.

In the pour-out member of the present invention, it is desired that:
(1) The base member is in the form of a container, a cap, a nozzle, a spout or a container preform;
(2) An interfacial profile between the hydrophobic layer and the base member has a surface roughness Rz (JIS B-0601-2001) of not less than 0.05 μm;
(3) The interfacial profile is formed by fine hydrophobic inorganic particles;
(4) The hydrophobic layer is formed by pushing the fine inorganic particles onto the upper end surface of the base member;
(5) The fine inorganic particles comprise a metal oxide;
(6) The fine inorganic particles comprise silica having a primary grain size in a range of 3 to 200 nm;
(7) The base member comprises a thermoplastic resin; and
(8) The thermoplastic resin is any one of polyethylene, polypropylene or polyethylene terephthalate.

Further, the present invention provides a method of producing the pour-out member by providing a base member having a pour-out port through which a viscous fluid is discharged and fine hydrophobic inorganic particles, and selectively pushing the fine inorganic particles onto the upper end surface of the base member forming the pour-out port in a heated condition to form a hydrophobic layer thereon.

In the production method of the present invention, it is desired that:
(1) The hydrophobic layer is formed by using a transfer member on which a transfer layer of the fine hydrophobic inorganic particles has been formed, and pushing the transfer layer onto the upper end surface of the base member with a predetermined pressure so that the transfer layer is transferred onto the upper end surface;

(2) The base member is in the form of a plastic container, a cap, a nozzle, a spout or a container preform; and (3) The fine inorganic particles are selectively pushed by using a jig having, formed in the surface thereof, a dent in which the upper end portion of the base member can be inserted, placing a powder of the fine inorganic particles in the dent of the jig in the form of a layer, inserting the upper end portion of the base member in the dent in a state where the fine inorganic particles placed therein are being heated, and pushing the upper end surface of the base member onto the dent.

Effects of the Invention

The pour-out member of the present invention is the upper end surface or the top surface of the base member forming the pour-out port, and an important feature resides in that a hydrophobic layer comprising fine hydrophobic inorganic particles is selectively formed on a portion that serves as the pour-out port.

That is, the hydrophobic layer has not been formed on the portions (e.g., inner surface side that comes in contact with the liquid content) other than the upper end surface of the base member that serves as the pour-out port. Therefore, the container having the above pour-out port is capable of effectively eliminating such a problem that the hydrophobic layer splits and enters into the liquid contained in the container despite the cap is opened and closed repetitively.

Further, even when the cap is repetitively opened and closed with the hydrophobic layer being formed in a manner of pushing the fine inorganic particles onto the upper end surface of the base member that serves as the pour-out port, the fine inorganic particles forming the hydrophobic layer are effectively prevented from splitting off. Namely, the hydrophobic layer is held maintaining stability and, as a result, the pour-out port shuts off the liquid sustaining the water-repelling property, and it is made possible to effectively prevent the container from being fouled with the liquid that creeps.

According to the present invention, further, the fine inorganic particles are selectively pushed in a heated state onto the upper end surface of the base member that serves as the pour-out port to selectively form the hydrophobic layer on the pour-out port (on the upper end surface). As compared to forming a film by using a special material, therefore, the work is very easy effectively avoiding an increase in the cost.

MODES FOR CARRYING OUT THE INVENTION

Figure 1:
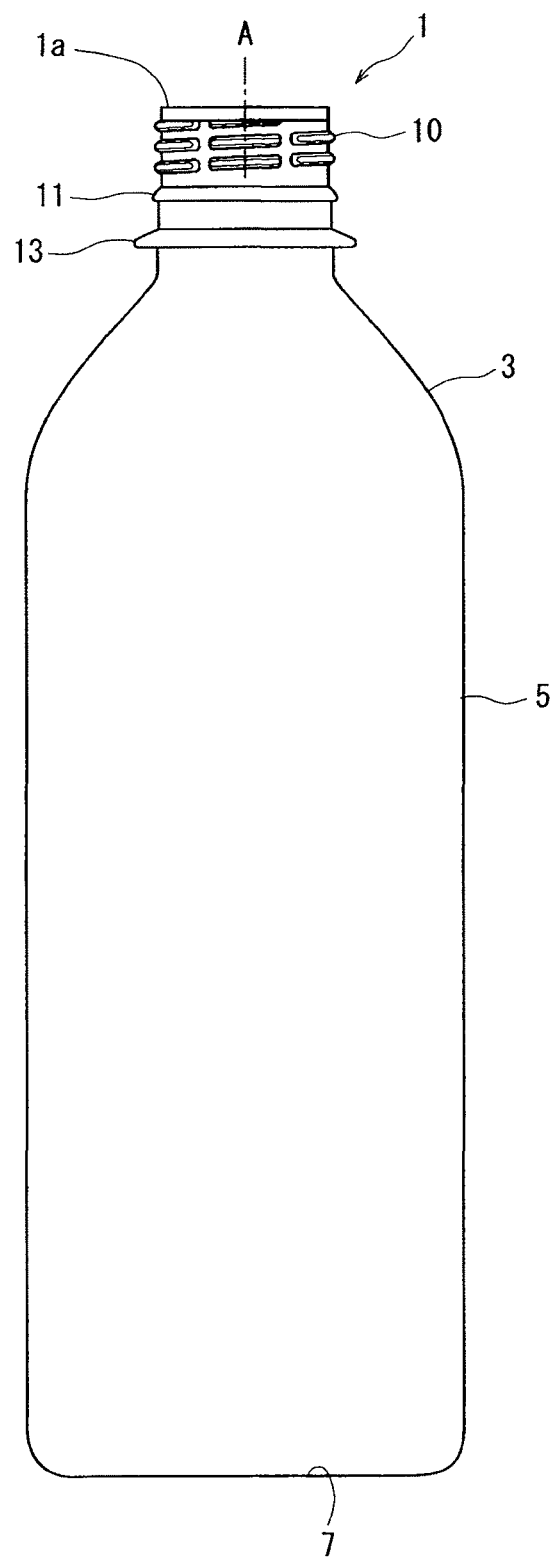
FIG. 1 is a whole view of a plastic bottle which is a representative example of a pour-out member of the present invention.

Referring to FIG. 1 showing a plastic bottle which is a representative example of the pour-out member of the present invention, the bottle has a cylindrical neck portion generally designated at 1 at its upper portion. The lower part of the neck portion is continuous to a shoulder portion 3 that curves outward. The shoulder portion 3 is continuous to a body portion 5, the lower end of the body portion 5 being closed with a bottom portion 7.

As will be learned from FIG. 1, a screw thread 10 is formed on the outer circumferential surface of the neck portion 1 and with which a cap engages by screw. A circumferential protuberance 11 is formed under the screw thread 10. Though not shown, a TE band is provided at the lower end of the cap that is fitted by screw, and engages with the circumferential protuberance 11 creating evidence that it has not been tampered. If the cap is opened, the TE band remains on the container side being separated away from the cap letting general consumers to know that the cap was once opened.

A support ring 13 of a large diameter is formed at the lowermost part of the neck portion 1. The bottle which is the pour-out member can be held and carried by utilizing the support ring 13.

Figure 2:
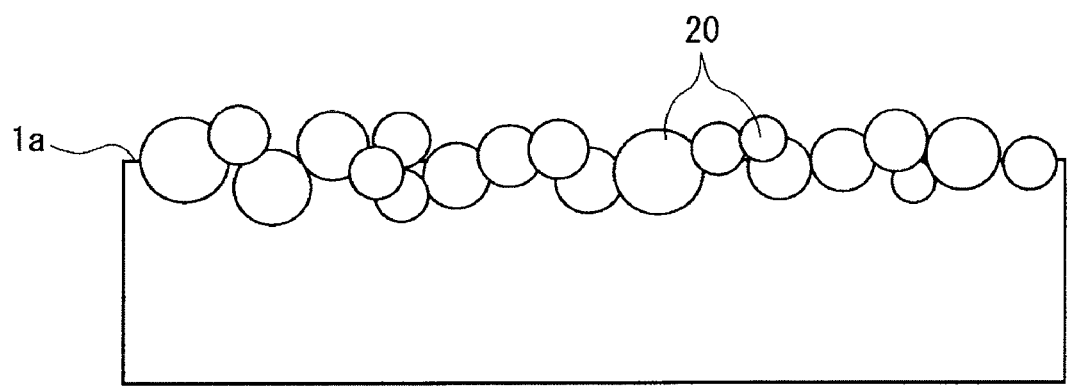
FIG. 2 is a sectional view of a portion A of the bottle of FIG. 1 and illustrates a hydrophobic layer formed by pushing in the fine inorganic particles.

The above cylindrical neck portion 1 forms a pour-out portion having an opening for pouring out the liquid content. According to the present invention as shown in FIG. 2, a hydrophobic layer of fine inorganic particles 20 having hydrophobic property is selectively formed on an upper end surface (top surface) 1a of the neck portion 1. That is, no hydrophobic layer is formed on the inner surface side that comes in contact with the liquid content, and no fine inorganic particle 20 is present thereon. This effectively prevents such a problem that the hydrophobic layer splits off and enters into the solution contained in the container even when the cap is opened and closed repetitively.

In the invention as shown in FIG. 2, further, the hydrophobic layer is desirably formed in a manner of pushing the fine inorganic particles 20 into the upper end surface 1a of the neck portion 1. Therefore, even if the cap is opened and closed many times repetitively, the fine inorganic particles 20 forming the hydrophobic layer are more effectively suppressed from splitting off; i.e., the hydrophobic layer is held maintaining stability preventing the liquid from creeping out of the l pour-out port 1a over extended periods of time.

Figure 3:
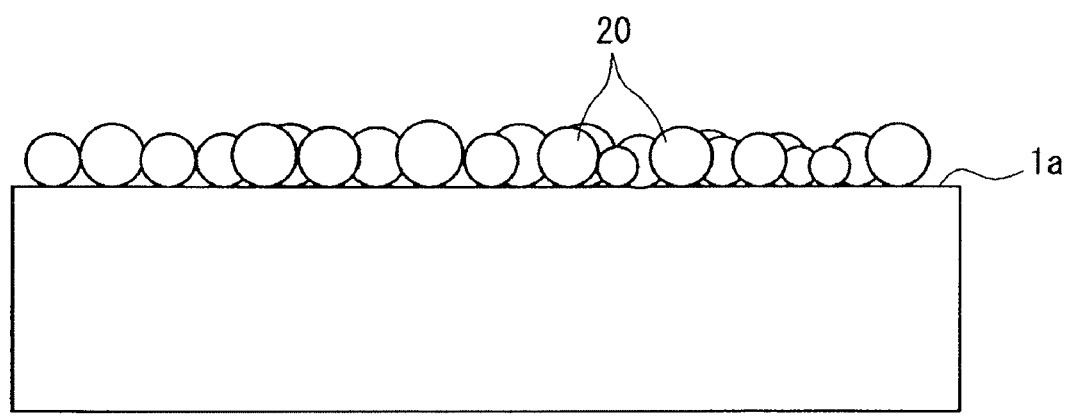
FIG. 3 is a view illustrating a hydrophobic layer formed without pushing in the fine inorganic particles.

Referring to FIG. 3, for example, the fine inorganic particles 20 without having been pushed onto the upper end surface 1a tend to easily split off when the cap is opened. Even if the fine inorganic particles 20 have not been split off toward the liquid in the container, it becomes difficult to maintain the effect for preventing the creeping of liquid when the liquid content is poured out by tilting the container.

The fine inorganic particles 20 that form the hydrophobic layer for preventing the creeping of liquid may be those particles imparted with hydrophobic property by the surface treatment. For example, there can be used fine particles obtained by treating the surfaces of fine hydrophilic oxide particles with a silane coupling agent or the like to render their surfaces to be hydrophobic.

The fine inorganic particles 20 are in many cases those of an oxide such as at least one of silica (silicon dioxide), alumina or titania. From the standpoint of forming a dense hydrophobic layer, further, it is desired that the fine inorganic particles 20 have a primary particle size in a range of 3 to 200 nm and, specifically, 3 to 100 nm. In the invention, what is most desirably used is a fine silica (e.g., fumed silica) treated on the surfaces thereof with the silane coupling agent.

Here, the primary particle size is an average diameter of the primary particles measured by using a transmission type electron microscope.

The hydrophobic layer formed from the fine inorganic particles 20 may be stretching up to a curved portion on the peripheral edge of the pour-out port (upper end surface of the neck portion 1).

As the plastic material for forming the bottle (i.e., base member that forms the pour-out port) that has the above neck portion 1, there can be used polyester as represented by polyethylene terephthalate (PET), and polyolefins such as polyethylene and polypropylene that have heretofore been used for forming the containers and, specifically, for forming containers for containing liquids. There can be, further, used a gas-barrier resin such as ethylene vinyl alcohol resin and an oxygen-absorbing agent (oxidizing resin or transition metal catalyst) in combination to form a multi-layer structure.

In the present invention, it is most desired that the mouth portion 1 is formed from the polyester such as PET.

FIG. 1 shows an example of when the invention is applied to a plastic bottle to which only, however, the invention is in no way limited.

The pour-out member having a pour-out port is not only limited to such containers as bottles, but also may be a filler nozzle or a spout fitted to bag-like containers, paper containers or bags for intravenous drip, or may be a spray nozzle, an ink-jet nozzle or an applying means. Namely, a resin layer may be formed on at least a portion that becomes the pour-out port of a nozzle made of a plastic material, a glass or a metal, and a hydrophobic layer of fine inorganic particles 20 may be selectively formed on the resin layer on the portion that becomes the pour-out port.

The hydrophobic layer can be formed on the pour-out port of not only the plastic bottles but also of the containers of glass, paper or metal according to the present invention. The hydrophobic layer of the fine inorganic particles 20 can also be formed on the pour-out port that becomes the upper end of the pour-out means even when a plastic pour-out means is fixed by fitting to the pour-out port made from the glass, paper or metal and the liquid content is poured out through the pour-out means.

Moreover, the containers are not limited to the bottles only but may also be wide-mouthed bottles or bags.

In the case of a container, the pour-out member having the hydrophobic layer mentioned above is typically produced as described below.

Figure 4:
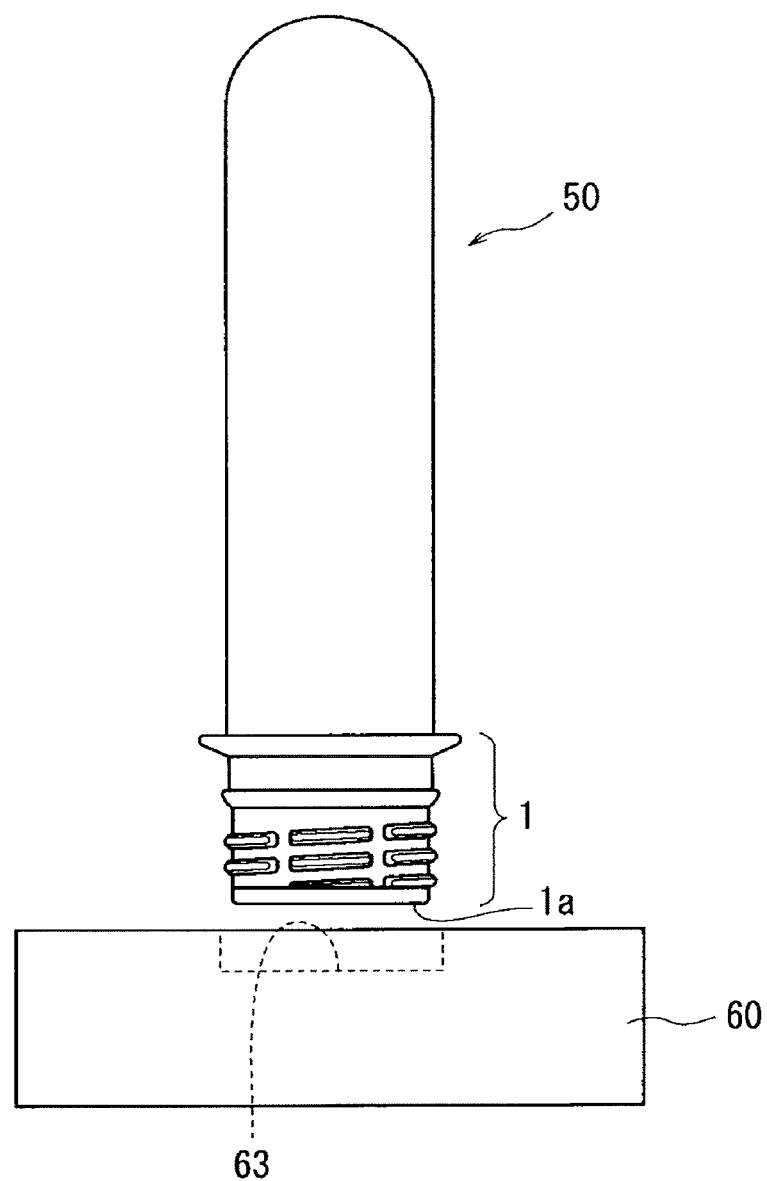
FIG. 4 is a view illustrating the step of forming the hydrophobic layer.

First, a preform 50 as shown in FIG. 4 is formed. The preform can be formed by the compression forming or the injection forming that has been known per se.

The preform is formed by the compression forming in a manner of continuously extruding a molten plastic material for forming the container by using an extruder, cutting the melt thereof by using a cutting means (cutter) of a resin feeder to obtain a molten resin mass (drop) which is a precursor for forming the preform in a molten state, holding the molten resin mass by a holding means (holder), throwing the molten resin mass into a cavity mold of a compression-forming machine through a guide means (throat), and compression-forming the molten resin mass in a core mold followed by cooling to solidify it.

When the preform is to be formed by the injection forming, there is no particular limitation on the injection conditions. Usually, however, a preform having bottom is formed at an injection temperature of 260 to 300° C. and under an injection pressure of 30 to 60 kg/cm$^2$.

The preform 50 that is formed as described above is forming the neck portion 1 of a form as shown in FIG. 1.

The hydrophobic layer is formed on the preform 50 by using the fine inorganic particles 20 to impart water-repelling property thereto.

First, as shown in FIG. 4, a jig 60 is provided for forming the hydrophobic layer.

The jig 60 is made from a rigid metal or the like, and is forming a dent 63 of a size which permits the insertion of the upper end portion of the mouth portion 1 of the preform 5. A powder of the fine inorganic particles 20 is filled or laid in the dent 63 of the jig 60. In this state, the fine inorganic particles 20 in the dent 63 are heated.

In the present invention, the preform 50 which is erected upside down is lowered so that the neck portion 1 thereof enters into the dent 63 in a state where the fine inorganic particles 20 have been heated, and is pushed thereto with a predetermined pressure. The pushing can be easily done by using a known device such as air cylinder or cam device.

Thus, the fine inorganic particles 20 are selectively pushed into the upper end surface 1a to selectively form the hydrophobic layer on the upper end surface 1a.

For example, a coating solution is prepared in which the fine inorganic particles have been dispersed, and is applied by dipping, spraying or by using a brush followed by drying to form the hydrophobic layer on the upper end surface 1a. With this means, however, the hydrophobic layer is easily to be formed on other portions, too, in addition to the upper end surface 1a as the coating solution creeps. When the cap is repetitively opened and closed, however, the hydrophobic layer that is formed on the portions other than the upper end surface 1a may split off and may enter into the liquid content contained in the container and may lose water-repelling property.

Further, though not shown, the hydrophobic layer can also be formed without directly filling the jig with the powder of the fine inorganic particles. For instance, the hydrophobic layer is formed on a film by applying a coating material containing the fine inorganic particles onto a biaxially stretched PET film followed by drying. Next, the film is arranged on a jig having a flat upper surface, the jig and the film are heated, and the preform is pushed thereon with a predetermined pressure. This method, too, makes it possible to form the hydrophobic layer to which water-repelling property is imparted. As the film-like or rolled material for forming the layer of the fine inorganic particles, there can be used the above-mentioned plastic materials such as biaxially stretched PET and biaxially stretched polypropylene, as well as metals such as aluminum and steel. The material may be suitably selected by taking into consideration the hardness of the base material (object product) on which the hydrophobic layer is formed and the hardness of the film-like material at a working temperature.

The above heating may be attained by either incorporating a heater or the like in the jig 60 or by selectively heating the fine inorganic particles 20 in the dent 63 from the exterior by such means as high-frequency heating or ultrasonic oscillation.

Further, the heating temperature is such that the fine inorganic particles 20 are pushed into the upper end surface 1a of the neck portion 1 of the preform 50 that is pushed, and may be suitably determined depending on the kind and properties of the plastic material forming the neck portion 1. The heating temperature is, for example, about 40 to about 140° C. if the neck portion 1 is formed from an amorphous PET.

In the invention, the preform 50 having the hydrophobic layer formed as described above is stretch-blow formed to obtain a container of the form of a bottle as shown in FIG. 1.

Prior to conducting the stretch-blow forming, the preform 50 is, as required, preheated up to a temperature suited for being stretched by such means as hot air, infrared-ray heater or high-frequency induction heating. To impart large heat resistance and mechanical strength to the stretched container, in particular, it is desired that the temperature in the case of the PET resin lies in a range of 85 to 130° C. and, specifically, 100 to 120° C.

The fine inorganic particles 20 are press-adhered onto the upper end portion of the mouth portion 1 of the preform 50 as described above. Thereafter, the fine inorganic particles 20 adhering to the portions other than the upper end surface 1a of the mouth portion 1 are removed therefrom by blowing the air. Thus the hydrophobic layer of the fine inorganic particles 20 is selectively formed on the upper end surface 1a.

The preform 50 is fed into a known stretch-blow-forming machine, set in a metal mold, drawn and stretched in the axial direction by pushing a stretch rod therein, and is stretch-formed in the circumferential direction by blowing a fluid therein. The metal mold temperature is, usually, in a range of room temperature to 230° C. When the preform is to be heat-set by a one-molding method as will be described later, however, the metal mold temperature is desirably set at 120 to 180° C.

The stretching ratio of the finally obtained PET resin container is, desirably, 1.5 to 25 times in terms of the area ratio. Here, it is desired that the stretching ratio in the axial direction is 1.2 to 6 times, and the stretching ratio in the circumferential direction is 1.2 to 4.5 times.

It is, further, allowable to conduct a two-molding method in a metal mold which is for heat-setting different from the metal mold for blow-molding.

In the above-mentioned production method, the hydrophobic layer was formed on the preform 50. It is, however, also allowable to form the hydrophobic layer on a container formed from the preform 50 in the same manner as described above.

Further, as for a container of a form obtained by fitting a plastic pour-out portion to a glass or metal container, the hydrophobic layer can be formed in the same manner as described above in a state where the pour-out portion is being fitted.

It is presumed that the present invention exhibits excellent effects on account of the following fact. Namely, upon pushing in the fine inorganic particles 20, the resin layer and the hydrophobic layer are adhered together more closely and, besides, the hydrophobic layer has a rigid structure. This is presumed to be that upon pushing the fine inorganic particles themselves into the resin layer which is the base member, the interface becomes ambiguous between the resin layer and the hydrophobic layer contributing to improving the adhesion therebetween and, as a result, enabling the hydrophobic layer to acquire a rigid structure as will also be understood from the measurement of an interfacial profile between the hydrophobic layer and the base member described in Examples appearing later. For instance, a surface roughness Rz (JIS B-0601-2001) of not less than 0.05 μm is possessed by the interfacial profile between the base material and the hydrophobic layer formed by pushing in the inorganic particles 20.

If the hydrophobic layer is formed on the resin layer by being dipped in a coating solution, on the other hand, the interface is clearly separated between the resin layer and the hydrophobic layer. Namely, it is considered that the adhesiveness is so small that the fine inorganic particles forming the hydrophobic layer easily peal and split off. The interfacial profile has a surface roughness which is smaller than 0.05 μm.

According to the present invention, the above rigid structure is formed over a wide range by providing a film on which fine inorganic particles are deposited, press-adhering the film onto the base material by using rolls so that the fine inorganic particles are transferred onto the base member to thereby form the hydrophobic layer on the surface of the base member over a wide area thereof. Described below are examples of the layer constitution of when the hydrophobic layer is formed on the inner surface of a bag-like container.

Olefin layer/aluminum layer/olefin layer/hydrophobic layer, and

Olefin layer/EVOH layer/olefin layer/hydrophobic layer.

The present invention makes it possible to effectively prevent the liquid from creeping when the liquid content is to be poured out. It is, therefore, desired to so select the form of the container and the liquid contained therein that the advantage of preventing the liquid creeping can be most utilized.

For instance, the liquid contents may be those having low viscosities through up to those having high viscosities without any limitation, and the container of the present invention is, specifically, desired as a container for containing non-carbonated beverages. That is, the carbonated beverage contains the carbonic acid dissolved therein and is, therefore, so filled as to leave some degree of head space of volume. The non-carbonated beverage, on the other hand, is filled to an almost full capacity without leaving head space. At the start of pouring out, therefore, the liquid starts to be poured out in a state where the container is tilted only slightly (container is assuming a nearly erected state) permitting the liquid to creep very easily. The present invention makes it possible to effectively prevent the liquid from creeping even in the initial period of pouring out the non-carbonated beverages.

In the plastic container, further, the container mouth portion has been formed in white color due to the heat crystallization for imparting heat resistance. Besides, the liquid content may be a colored liquid such as coffee, soy sauce or a variety of juices. Therefore, the fouling becomes very conspicuous around the container mouth portion if the liquid contained therein creeps. The present invention, therefore, is very useful in such cases effectively preventing the liquid from creeping.

It is, further, desired that the present invention is applied to the bottles that contain beverages in amounts of not less than 500 ml. Namely, with the bottles having volumes of as small as about 180 ml, the user would, in many cases, drink the content directly through the container mouth portion. As the volume of the bottles become large, however, the user would drink the content by once pouring the liquid content into a cup or the like, which gives rise to the occurrence of a problem, i.e., liquid creeping. Therefore, the present invention can be effectively applied to the bottles having large volumes, too.

In the foregoing was described the pour-out member of the invention with reference to the containers such as bottles or the container preforms. As described above, however, there is no specific limitation on the pour-out member of the present invention provided it has a pour-out port for discharging the viscous fluid (i.e., liquids as represented by foods such as beverages). For instance, the present invention can also be applied to a cap with pour-out port, a spout attached to bag-like containers and paper containers, as well as such nozzles as filler nozzles and ink-jet nozzles.

EXAMPLES

Excellent effects of the invention will now be described by the following experiments.
A. Testing PET Bottles.
(Testing the Adhesiveness of the Films)

As sample bottles imparted with water-repelling property by the methods of the following Examples and Comparative Examples, 500-ml PET bottles were used and were each filled with 480 ml of coffee heated at 85° C. (viscosity at 25° C.: 10 mPa·s (B-type viscometer)) as liquid content. After filled, the bottles were sealed with a polypropylene cap, and were cooled with flushing water.

After cooled, the fitted cap was opened to make sure with the eye if any matter was floating in the liquid content. The case where no floating matter was confirmed was evaluated to be ○ and the case where floating matter was confirmed was evaluated to be x.
(Testing Liquid Creeping)

After the film was tested for its adhesiveness, the samples were moved and turned by using a predetermined jig based on the data of center of gravity and tilting angle obtained by mimicking the human behavior of holding a bottle by hand and pouring it by hand, and the state of liquid creeping was observed with the eye. The case where the liquid content flew down to the portion where the screw thread has been formed was evaluated to be x, and the case where the liquid content did not flow down to the portion where the screw thread has been formed and has not reached there was evaluated to be ○.
(Testing the Sustenance of Water Repellency)

The sample bottles imparted with water-repelling property by the methods of the following Examples and Comparative Examples were each filled with 480 ml of coffee heated at 85° C. (viscosity at 25° C.: 10 mPa·s (B-type viscometer)) as liquid content. After filled, the bottles were sealed with the polypropylene cap, and were cooled with flushing water. After cooled, the bottles were preserved for predetermined number of days in an environment maintained at 22° C. 60% RH. After preserved, the cap was opened to test the liquid creeping. After the test, it was confirmed with the eye if the liquid content remained adhered on the water-repellent film on the nozzle. The case where no liquid content adhered on the water-repellent film was evaluated to be ○ and the case where the liquid content adhered was evaluated to be x.
(Measuring the Interfacial Profile)

The pour-out port that was prepared was dipped in ethanol and to which ultrasonic oscillation was applied to remove the fine silica particles that had been forming the hydrophobic layer. The base member was measured for its surface roughness on a portion from where the hydrophobic layer has been removed by using a surface roughness•shape measuring apparatus (SURFCOM 2000SD3-13 manufactured by Tokyo Seimitsu Co.), and the profile thereof was regarded to be an interfacial profile between the hydrophobic layer and the base member. The measuring conditions were as follows:
Length of measurement: 0.7 mm
Rate of measurement: 0.300 mm/s
Length of preliminary drive: $\lambda c/3 \times 2$
Measuring range: ±6.400 μm
Calculation standard: JIS-'01 Standard
$\lambda s$ cutoff ratio: 300
Type of cutoff: Gaussian
Cutoff wavelength ($\lambda c$): 0.025 mm
Evaluation length: 0.500 mm Based on the calculation standard of JIS-'01, the arithmetic mean roughness Ra and the maximum roughness Rz were calculated as average values (n=20) with the reference length of 0.025 mm and the evaluation length of 0.500 mm from the roughness curve.
B. Testing the Hinge Cap with Pull-Ring.
(Testing the Adhesiveness of the Films)

There were provided hinge caps with pull-ring imparted with water-repelling property by the methods of the following Examples and 500-ml polyethylene terephthalate (PET) bottles. The bottles were filled with 500 ml of soy sauce heated at 25° C. as the liquid content. After filled, the bottles were sealed with the hinge cap imparted with water-repelling property.

Thereafter, the pull ring of the hinge cap that was fitted was removed to unseal the bottle. The cap was fitted again to make sure with the eye if any matter was floating in the liquid content. The case where no floating matter was confirmed was evaluated to be ○ and the case where floating matter was confirmed was evaluated to be x.
(Testing Liquid Creeping)

In testing the film for its adhesiveness, the state of liquid creeping was observed with the eye. The case where the liquid content (soy sauce) flew down from the pour-out portion without being shut off was evaluated to be x, and the case where the liquid content stopped flowing at the pour-out portion was evaluated to be ○.
(Testing the Sustenance of Water Repellency)

There were provided hinge caps with pull-ring imparted with water-repelling property by the methods of the following Examples and 500-ml polyethylene terephthalate (PET) bottles. The bottles were filled with 500 ml of soy sauce heated at 25° C. as the liquid content. After filled, the bottles were sealed with the hinge cap imparted with water-repelling property.

Thereafter, the pull ring of the hinge cap that was fitted was removed to unseal the bottle. About 20 ml of the liquid content was poured out, and the hinge cap was closed again. Thereafter, the hinge cap was opened again, about 20 ml of the liquid content was poured out, and the hinge cap was closed. After the operation of opening and closing the hinge cap was repeated a predetermined number of times, it was confirmed with the eye if the liquid content remained adhered on the water-repelling film to evaluate the property in the same manner as that of testing the sustenance of water-repelling property of the bottles.

The following Examples 1, 2, Comparative Example 1 and Reference Example were the experimental examples of when the present invention was applied to the PET bottles.

Example 1

By using an injection-forming machine (NN75JS manufactured by Niigata Tekkosho Co.), a polyethylene terephthalate (PET) resin (RT543CTHP produced by Nihon Unipet Co.) that has been dried was injection-formed at a barrel setpoint temperature of 280° C. in a cycle time of 30 seconds to obtain an amorphous preform weighing 28 g (for a 500-ml PET bottle).

After formed, there was provided, as the lower mold (jig 60 for forming hydrophobic layer), an aluminum mold equipped with a band heater and having, in the upper surface thereof, a dent (recessed portion 63) of a diameter of 32 mm and a depth of 1.8 mm, and hydrophobic silica (RX300 produced by Nihon Aerosil Co.) was filled in the dent.

After filled, the whole lower mold was heated by the band heater at 60° C. As the upper mold, there was provided an aluminum mold capable of fixing the preform. The formed amorphous preform was fixed thereto with the nozzle portion facing downward, and the upper mold was pressed onto the lower mold with a pressure on the working surface of 72 MPa for 3.2 seconds to press-adhere the hydrophobic silica to the top surface of the amorphous preform.

After press-adhered, the hydrophobic silica that has not been press-adhered was removed by blowing the air. Thereafter, the mouth portion was whitened by being crystallized by heating. Thereafter, the body portion of the preform was heated at predetermined surface temperatures from the outer side by using an infrared-ray heater and from the inner side by using a heated iron core. Thereafter, the preform was biaxially stretched by blowing to form a 500-ml stretch-blown bottle shown in FIG. 1 that was stretched roughly to 3 times longitudinally, 3 times transversely and 9 times in area. The metal mold temperature was set to lie in a range of 90 to 150° C. The air that was blown was the compressed air of room temperature (20° C.). At the time of parting, the cooling air of room temperature (20° C.) was introduced into the container.

The 500-ml PET bottle having the hydrophobic silica press-adhered onto the nozzle portion thereof was tested for the adhesiveness of the film, creeping of liquid and sustenance of water-repelling property. The results were as shown in Table 1. Through the observation by using a scanning type electron microscope, it was confirmed that a hydrophobic layer had been selectively formed on the upper end surface of the nozzle portion (upper end surface 1a of the pour-out portion) of the PET bottle.

Figure 5:
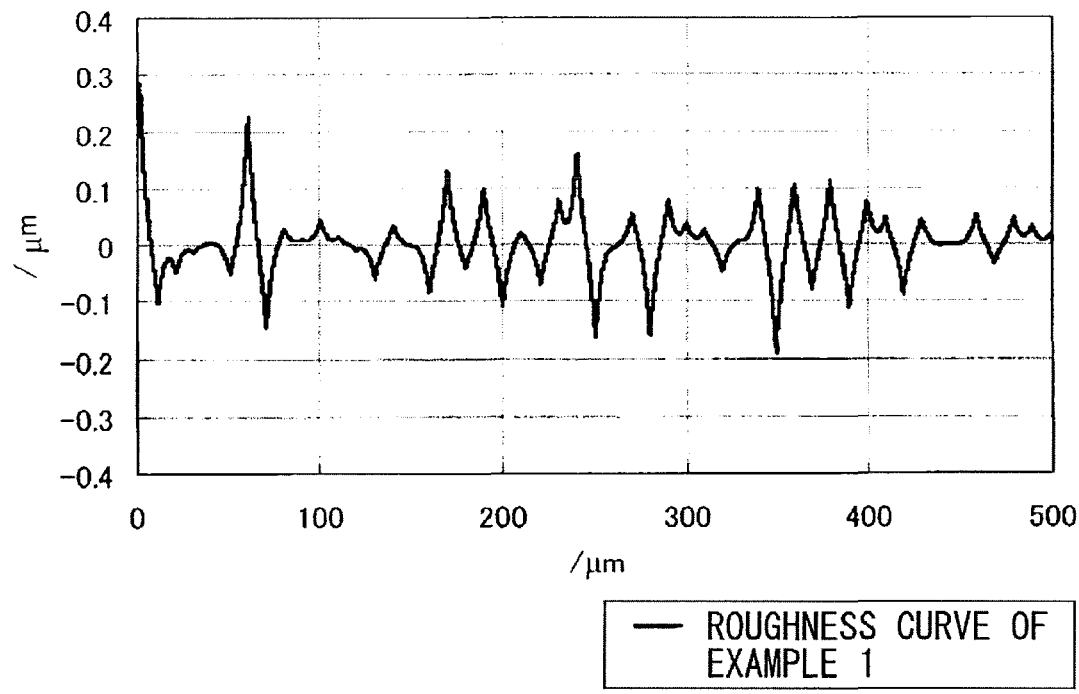
FIG. 5 is a graph of an interfacial profile of a bottle prepared in Example 1.

Further, the bottle that was produced was measured for its interfacial profile between the hydrophobic layer and the base member. The results were as shown in Table 2 and FIG. 5.

Example 2

0.4 Grams of a polyester resin (Bylon 200 produced by Toyobo Co.), 100 g of a methyl ethyl ketone (produced by Wako Junyaku Co.) and stirrer chips were put into a glass bottle, sealed therein, and were stirred by using a stirrer to a sufficient degree until the resin has dissolved. Thereafter, 3 g of hydrophobic silica (RX300 produced by Nihon Aerosil Co.) was added thereto, and was stirred by using the stirrer for 30 minutes. After stirred, the ultrasonic treatment was conducted for 30 minutes to obtain a homogeneous solution.

By using a bar coater, the obtained solution was applied onto one surface of a PET film of a thickness of 100 μm, and was dried in an oven heated at 100° C. for 2 minutes to obtain a film coated with the hydrophobic silica. A water droplet that was fallen on the film did not adhere thereto despite it was a small droplet proving water-repelling property.

A PET bottle was obtained in the same manner as in Example 1 but providing an aluminum block having a hard urethane rubber on the upper surface of the lower mold, placing the hydrophobic silica-coated film on the upper surface of the lower mold, heating the whole lower mold at 100° C. and applying a pressure of 24 MPa on the working surface.

The obtained PET bottle was tested for the adhesiveness of the film, creeping of liquid and sustenance of water-repelling property. The results were as shown in Table 1.

Through the observation by using the scanning type electron microscope, it was confirmed that a hydrophobic layer had been selectively formed on the upper end surface of the nozzle portion (upper end surface 1a of the pour-out portion) of the PET bottle.

Comparative Example 1

3 Grams of hydrophobic silica (RX300 produced by Nihon Aerosil Co.), 97 g of ethanol (special grade, produced by Wako Junyaku Co.) and stirrer chips were put into a glass bottle, stirred therein by using a stirrer for 30 minutes, and were treated with ultrasonic waves for 30 minutes. To this mixed solution, there were added dropwise 0.54 g of a tetraethoxysilane (produced by Shin-etsu Kagaku Co.), 0.04 g of hydrochloric acid (1N) and 0.16 of pure water in this order, and they were mixed together. Thereafter, the mixed solution was stirred by using a stirrer for 2.5 hours, and was treated with ultrasonic waves for 30 minutes to obtain a water-repelling coating solution.

An amorphous preform was formed in the same manner as in Example 1. Thereafter, a bottle was blow-formed in the same manner as in Example 1 but forming a preform having a mouth portion that was whitened by crystallization by heating. With the nozzle portion facing downward, the PET bottle that was formed was dipped in the water-repelling coating solution up to the starting position of the screw thread of the bottle for 5 seconds, and was pulled up at a rate of 2 mm/min. followed by drying at room temperature for 30 minutes to obtain the PET bottle.

Figure 6:
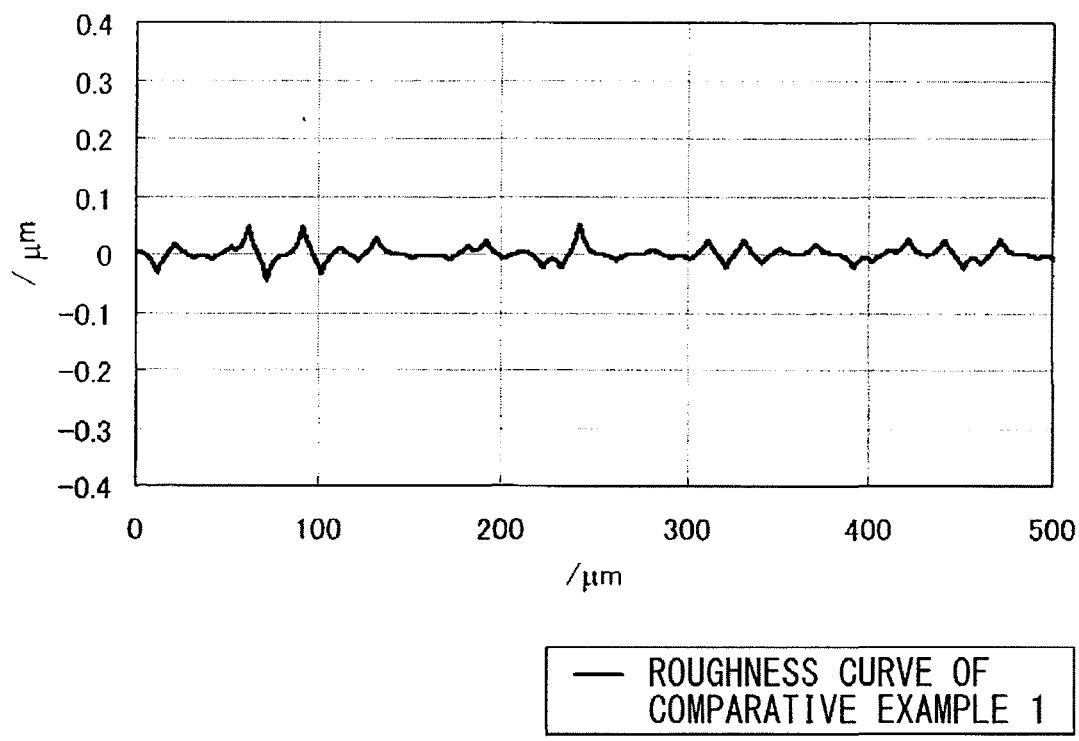
FIG. 6 is a graph of an interfacial profile of a bottle prepared in Comparative Example 1.

The obtained PET bottle was tested for the adhesiveness of the film, creeping of liquid and sustenance of water-repelling property, and was measured for its interfacial profile. The results were as shown in Tables 1 and 2, and in FIG. 6.

Reference Example

Figure 7:
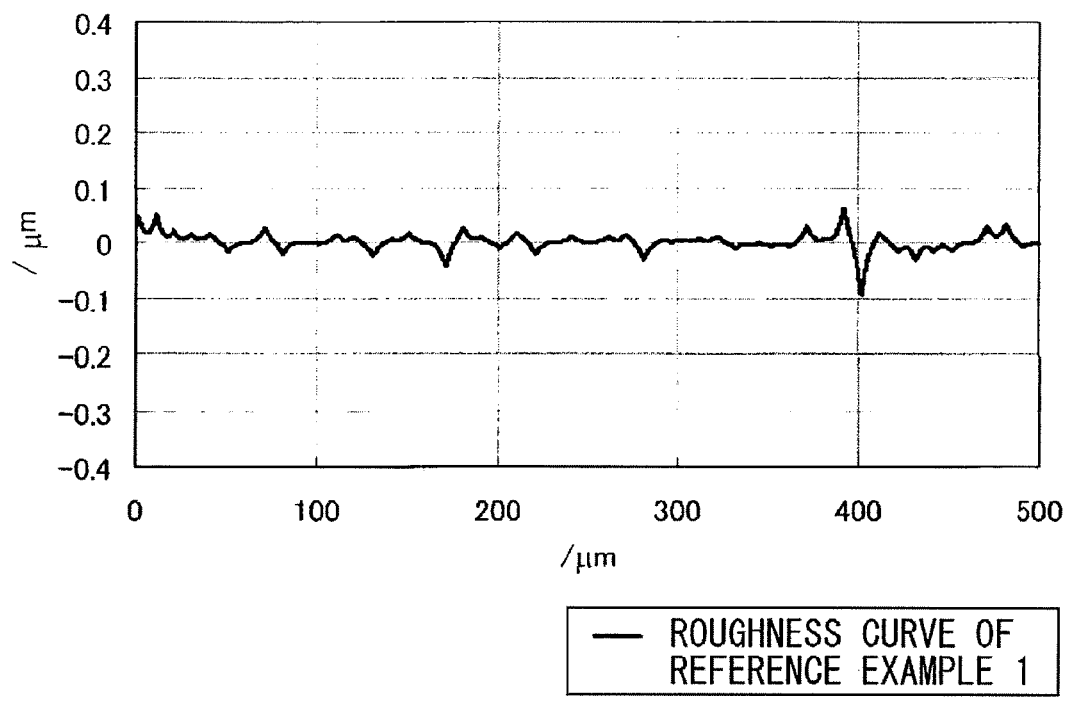
FIG. 7 is a graph of an interfacial profile of a bottle prepared in Reference Example.

A PET bottle was prepared in the same manner as in Example 1 but forming no hydrophobic layer. The obtained PET bottle was measured for its interfacial profile. The results were as shown in Table 2 and FIG. 7. Since there has been formed no hydrophobic layer, the interfacial profile in the Reference Example represents the surface profile of the PET bottle.

From the results of testing the adhesiveness of the film, it was learned that in Comparative Example 1, the water-repelling film was broken when the cap was opened, migrated into the content, and was confirmed as a floating matter. It was, therefore, learned that the adhesiveness could not meet the requirement of practical use.

In Examples 1 and 2, on the other hand, no floating matter was confirmed even after the cap was opened. This was because it is considered that the water-repelling film was not broken. It was, therefore, learned that a sufficiently close adhesiveness has been realized between the water-repelling film and the base member (PET resin).

The results of the test of liquid creeping showed the occurrence of liquid creeping in none of Example 1, 2 or Comparative Example 1, and proved favorable liquid shut-off property.

As for the sustenance of the water-repelling property, however, a difference was recognized between Examples 1, 2 and Comparative Example 1. That is, in the test of sustenance of water-repelling property, no liquid content adhered on the water-repelling film in Examples 1 and 2 even after the bottles were preserved for 28 days from when they were filled with the coffee. In Comparative Example 1, however, the liquid content adhered on the water-repelling film after the bottle was preserved for 3 days, indicating a decrease in the water-repelling property.

Upon judging the interfacial conditions between the hydrophobic layer and the base member based on the results of measurement of the interfacial profiles, it can be said that Comparative Example 1 is forming a clear interface without almost no roughness whereas Example 1 is forming an ambiguous interface having roughness.

In Example 1, it can be so comprehended that the anchoring effect is exhibited since the interface is ambiguous between the hydrophobic layer and the base member, and a strong adhesiveness is provided against the instantaneous stress at the time of opening the cap or against the stress in a period in which the cap remains closed, the water-repelling film without being broken and sustaining water-repelling property. In Comparative Example 1, on the other hand, it can be so comprehended that almost no anchoring effect is exhibited since the interface is clear between the hydrophobic layer and the base member and, therefore, the water-repelling film is very weak against the stress and is broken. As for the anchoring effect in Example 1, it is considered that the fine hydrophobic inorganic particles were pushed into the base member to form the hydrophobic layer, i.e., the fine hydrophobic inorganic particles were buried in the base member while reflecting the shapes of the fine inorganic particles enabling the hydrophobic layer to be formed having strength against the stress.

The following Example deals with a case where the present invention was applied to a hinge cap with pull ring.

Example 3

As the lower mold (jig 60 for forming hydrophobic layer), there was provided an aluminum mold equipped with a band heater and forming a dent (recessed portion 63) 40 mm in diameter and 1.8 mm in depth, and the dent was filled with a hydrophobic silica (R812S produced by Nihon Aerosil Co.).

After filled, the whole lower mold was heated at 100° C. by the band heater. As the upper mold, there was provided an aluminum mold capable of fixing the hinge cap. The hinge cap with polyethylene pull ring was fixed to the lower mold with the pour-out portion of the hinge cap facing downward, and the upper mold was pushed onto the lower mold with a pressure of 0.1 MPa for 2 seconds to press-adhere the hydrophobic silica onto the top surface of the pour-out portion of the hinge cap.

After press-adhered, the hydrophobic silica that has not been press-adhered was removed by blowing the air to obtain the hinge cap with pull ring. The obtained hinge cap was tested for the adhesiveness of the film, creeping of liquid and sustenance of water-repelling property. The results were as shown in Table 3. It was confirmed that the hydrophobic layer had been selectively formed on the upper end surface of the pour-out portion of the hinge cap with pull ring.

Results of the test of adhesiveness of the film indicate that the water-repelling film in Example 3 was not broken even after the cap was opened, and no floating matter was recognized. It is, therefore, learned that a sufficiently large adhesiveness has been realized between the water-repelling film and the base member (PE resin). Even after the hinge cap was opened and closed 25 times, practicable durability was maintained without permitting liquid to creep.

From the above results, it is learned that the present invention improves close adhesion between the base member and the water-repelling film in addition to effectively preventing the liquid content from creeping and, further, realizes rigid structure without permitting the film to be removed when the cap is opened and maintaining water-repelling property over extended periods of time.

TABLE 1

|  | Adhesion of film | Liquid creeping | *1 | Sustenance of water repellency | | |
|---|---|---|---|---|---|---|
|  |  |  |  | After 3 days | After 9 days | After 28 days |
| Ex. 1 | ○ | ○ | ○ | — | ○ | ○ |
| Ex. 2 | ○ | ○ | ○ | — | — | ○ |
| Comp. Ex. 1 | X | ○ | ○ | X | — | — |

*1: Immediately after cooled

TABLE 2

|  | Ra/μm | Rz/μm |
|---|---|---|
| Example 1 | 0.023 | 0.114 |
| Comp. Example 1 | 0.007 | 0.034 |
| Ref. Example (without hydrophobic layer) | 0.008 | 0.037 |

TABLE 3

|  | Adhesion of film | Liquid creeping | *1 | Sustenance of water repellency | | |
|---|---|---|---|---|---|---|
|  |  |  |  | *2 | *3 | *4 |
| Ex. 3 | ○ | ○ | ○ | ○ | ○ | ○ |

*1: When opened
*2: After 5 times of opening and closing
*3: After 10 times of opening and closing
*4: After 25 times of opening and closing

DESCRIPTION OF REFERENCE NUMERALS

1: neck portion of the container
1a: upper end surface (pour-out port) of the neck portion
20: fine inorganic particles
50: preform

The invention claimed is:

1. A pour-out member having a pour-out port through which a viscous fluid is discharged, wherein a hydrophobic layer of fine hydrophobic inorganic particles is selectively formed on an upper end surface of a base member forming said pour-out port, and wherein:

(a) an interfacial profile between the hydrophobic layer and the base member has a surface roughness Rz (JIS B-0601-2001) of not less than 0.05 μm;
(b) the interfacial profile is formed by the fine hydrophobic inorganic particles;
(c) the fine hydrophobic inorganic particles are buried in the base member; and
(d) the hydrophobic layer is a continuous layer.

2. The pour-out member according to claim 1, wherein said base member is in the form of a container, a cap, a nozzle, a spout or a container preform.

3. The pour-out member according to claim 1, wherein said hydrophobic layer is formed by pushing said fine inorganic particles onto the upper end surface of said base member.

4. The pour-out member according to claim 1, wherein said fine inorganic particles comprise a metal oxide.

5. The pour-out member according to claim 4, wherein said fine inorganic particles comprise silica having a primary grain size in a range of 3 to 200 nm.

6. The pour-out member according to claim 1, wherein said base member comprises a thermoplastic resin.

7. The pour-out member according to claim 6, wherein said thermoplastic resin is any one of polyethylene, polypropylene or polyethylene terephthalate.

8. A method of producing the pour-out member of claim 1 by providing a base member having a pour-out port through which a viscous fluid is discharged and fine hydrophobic inorganic particles, and selectively pushing said fine inorganic particles onto the upper end surface of the base member forming said pour-out port in a heated condition to form a hydrophobic layer thereon,
wherein said fine inorganic particles are selectively pushed by using a jig having, formed in the surface thereof, a dent in which the upper end portion of said base member can be inserted, placing a powder of said fine inorganic particles in the dent of said jig in the form of a layer, inserting the upper end portion of said base member in said dent in a state where the fine inorganic particles placed therein are being heated, and pushing the upper end surface of said base member onto said dent.

9. The method of production according to claim 8, wherein said hydrophobic layer is formed by using a transfer member on which a transfer layer of said fine hydrophobic inorganic particles has been formed, and pushing said transfer layer onto the upper end surface of said base member with a predetermined pressure so that said transfer layer is transferred onto said upper end surface.

10. The method of production according to claim 8, wherein said base member is in the form of a plastic container, a cap, a nozzle or a container preform.

* * * * *